(12) United States Patent
Eaton et al.

(10) Patent No.: US 6,532,532 B1
(45) Date of Patent: Mar. 11, 2003

(54) INSTRUCTION EXECUTION MECHANISM

(75) Inventors: John Richard Eaton, Salford (GB); Kevin Hughes, Glossop (GB)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/419,208

(22) Filed: Oct. 15, 1999

(30) Foreign Application Priority Data

Dec. 19, 1998 (GB) .............................................. 9827963

(51) Int. Cl.$^7$ ................................................. G06F 9/45
(52) U.S. Cl. ........................................ 712/209; 717/159
(58) Field of Search ........................... 712/209; 703/22; 717/136, 137, 151, 159

(56) References Cited

U.S. PATENT DOCUMENTS

| | | | |
|---|---|---|---|
| 4,439,828 A | | 3/1984 | Martin .......................... 364/200 |
| 5,815,720 A | * | 9/1998 | Buzbee ......................... 717/145 |
| 5,950,009 A | * | 9/1999 | Bortnikov et al. ........... 712/214 |
| 5,966,536 A | * | 10/1999 | Ravichandran .............. 717/153 |
| 5,966,537 A | * | 10/1999 | Ravichandran .............. 717/158 |
| 5,970,249 A | * | 10/1999 | Holzle et al. ................ 717/153 |
| 5,995,754 A | * | 11/1999 | Holzle et al. ................ 717/158 |
| 6,009,514 A | * | 12/1999 | Henzinger et al. .......... 712/236 |
| 6,029,004 A | * | 2/2000 | Bortnikov et al. .......... 712/214 |
| 6,275,981 B1 | * | 8/2001 | Buzbee et al. .............. 717/158 |
| 6,332,214 B1 | * | 12/2001 | Wu ............................. 717/141 |

FOREIGN PATENT DOCUMENTS

| | | |
|---|---|---|
| EP | 0 372 196 | 8/1989 |
| EP | 0 372 835 | 6/1990 |
| WO | 92/15937 | 11/1992 |
| WO | 94/27214 | 11/1994 |
| WO | 97/25669 | 7/1997 |

OTHER PUBLICATIONS

Hunter, "Dos at RISC", Byte Magazine, vol. 14, No. 12, 11/89, pp. 361–366.

* cited by examiner

*Primary Examiner*—Eric Coleman
(74) *Attorney, Agent, or Firm*—Barnes & Thornburg

(57) ABSTRACT

A computer system in which blocks of source code instructions are translated into blocks of target code instructions and executed. During execution, the system builds up dynamic behavior information about frequency of execution of, and relationships between, the blocks. On the basis of this information, a block coalition mechanism selects blocks, and combines them to form an optimized superblock of target code instructions that is functionally equivalent to the combination of the selected blocks. In this way, the system can start with relatively small, naively translated blocks, and build up larger, more optimized blocks, on the basis of the dynamic behavior of the code.

26 Claims, 2 Drawing Sheets

INSTRUCTION EXECUTION MECHANISM

BACKGROUND TO THE INVENTION

This invention relates to an instruction execution mechanism for a computer system.

The invention is particularly concerned with a computer system in which source instructions are translated into target instructions for execution on a particular processor. This may be required, for example, where one processor is being used to emulate another, in which case the instructions for the processor being emulated must be translated into instructions for the emulating processor.

One approach, referred to as interpretation, is to translate the instructions one at a time. That is, each source instruction is translated into a sequence of one or more target instructions, without reference to any other source instructions. Interpretation can be very inefficient, since each source instruction may be translated into a long sequence of target instructions, resulting in very poor performance.

A more efficient approach is to use a block of source instructions as the unit of translation, rather than a single instruction. That is, the source code is divided into blocks, and each source code block is translated into a block of target instructions, functionally equivalent to the source code block. Typically, a block has a single entry point and one or more exit points. The entry point is the target of a source code jump, while the (or each) exit is a source code jump.

Using blocks as the units of translation is potentially much more efficient, since it provides opportunities for eliminating redundant instructions within the target code block, and other optimisations. Known optimising compiler techniques may be employed for this purpose.

The target code blocks may be held main memory and/or a cache store, so that they are available for re-use if the same section of code is executed again, without the need to translate the block. The blocks held in main memory clearly need to be managed, because memory is a finite resource and their usage changes over time, reflecting changes in behaviour of the system. In particular, source code blocks may be deleted, changed, or simply paged out to make room for other blocks.

It has been shown that the size of the source code blocks heavily influences the effectiveness of the translation. Larger source code blocks tend to give better performance by reducing inter-block overheads and by allowing greater scope for optimisation within both the source code and target code blocks. Also, larger target code blocks tend to be easier to manage, since there are fewer of them.

On the other hand, if very large source code blocks are used, large amounts of code may be translated and stored unnecessarily. This results in an increased translation overhead, and wastes storage space.

The object of the present invention is to provide a way of benefiting from the advantages of larger-sized blocks, while avoiding the disadvantages.

SUMMARY OF THE INVENTION

According to the invention, a computer system comprises:
(a) translation means for translating blocks of instructions from a source code into a target code;
(b) execution means for executing the blocks, while building up dynamic behaviour information about relationships between the blocks; and
(c) block coalition means for selecting a related group of blocks on the basis of the dynamic behaviour information, and combining the selected group of blocks to form a new block of target code instructions that is functionally equivalent to the combination of the selected group of blocks.

It can be seen that the invention allows the system to start with relatively small blocks, and then to combine them into larger blocks, based on the dynamic behaviour of the code. This provides a way of maximising performance without wasting too much store space.

One computer system embodying the invention will now be described by way of example with reference to the accompanying drawings.

DESCRIPTION OF AN EMBODIMENT OF THE INVENTION

Figure 1:
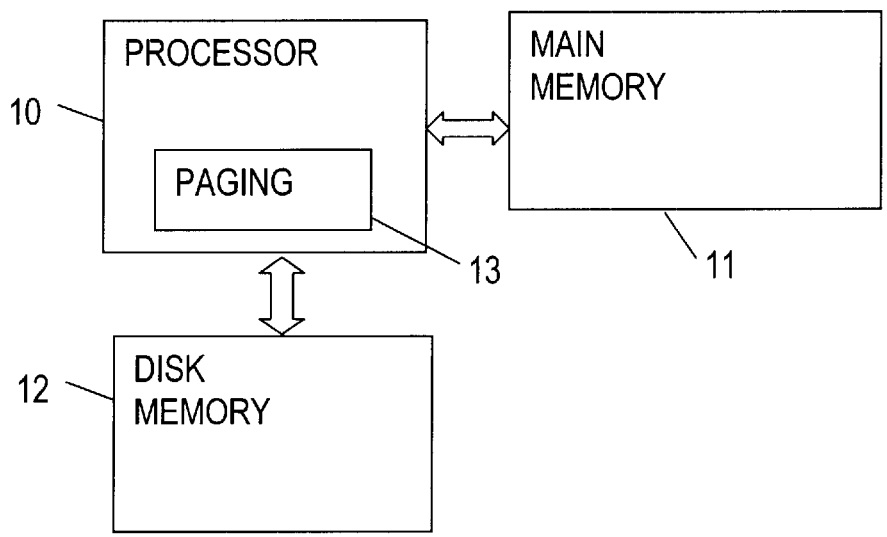
FIG. 1 is a block diagram of a computer system embodying the invention.

FIG. 1 shows a computer system comprising a processing unit 10, main memory 11, and disk memory 12.

The disk memory holds a number of source code blocks. These blocks are copied (paged) into the main memory, on demand, by means of a conventional paging mechanism 13. Therefore, at any given time, the main memory holds copies of the most recently used source code blocks. In the present example, each of the source code blocks has a single entry point, and a maximum of two exit points.

Figure 2:
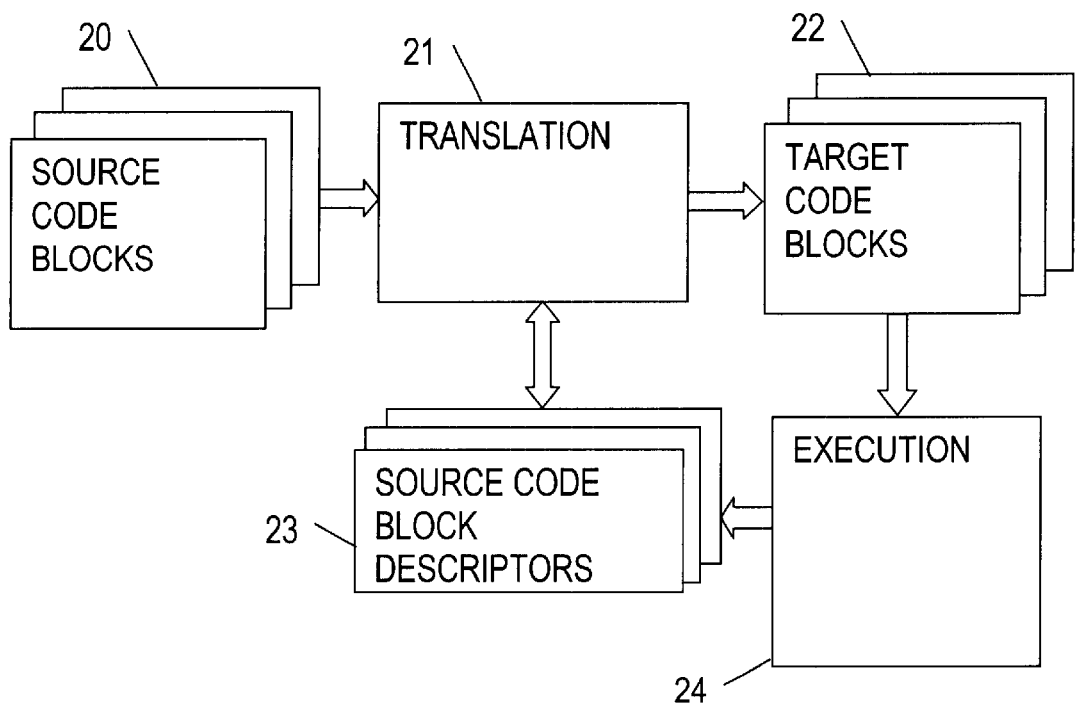
FIG. 2 is a schematic block diagram, showing source code blocks, source code block descriptors, target code blocks, and a number of processes that operate on these blocks within the computer system.

FIG. 2 shows a number of source code blocks 20 in the main memory. A binary translation process 21 running in the processor translates these blocks into target code blocks 22, which are also stored in the main memory. The target code blocks are logically variable in size. The target code blocks can be stored in one or more different ways:

As variable sized blocks of memory.

As fixed size blocks of memory, large enough to cope with a typical target code block.

As fixed size blocks of memory, with the potential for linking together.

The main memory also holds a number of source block code descriptors 23, one for each of the source code blocks in the main memory. Each descriptor is of fixed size, and holds the following information for its associated source code block:

The virtual addresses of the start and end of the source code block.

A pointer to the associated target code block.

An execution count value, indicating the number of times the target code block has been executed.

First and second links. These are pointers to other target code blocks (if any) that this block has passed control to (i.e. jumped to) during execution.

First and second link count values. These respectively indicate the number of times the first and second links have been traversed during execution.

Figure 3:
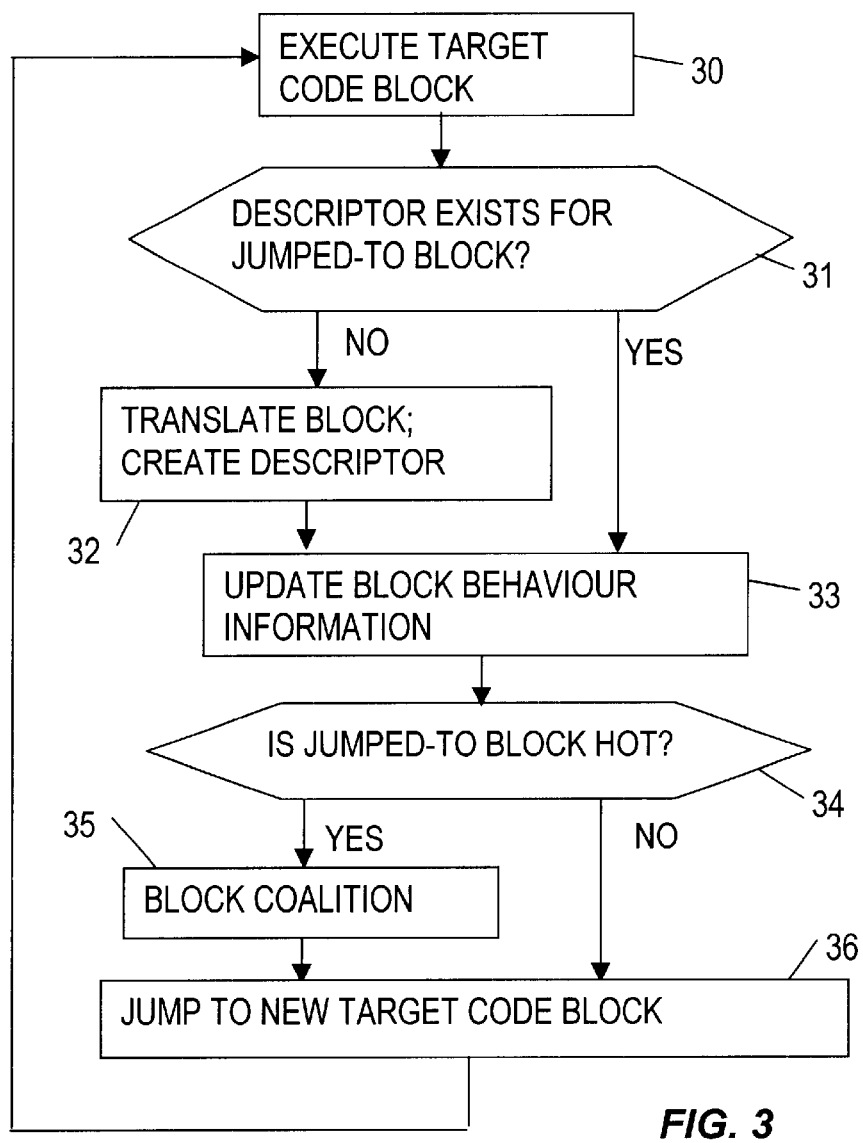
FIG. 3 is a flow chart of an execution process within the computer system.

The processor also runs an execution process 24, which sequences the execution of the target code blocks. Referring to FIG. 3, the execution process repeatedly performs a loop, as follows.

(Step 30) First, the execution process executes the current target code block. This will end with a jump to a source code block, with a specified virtual address.

(Step 31) The execution process then searches for a source code block descriptor whose start address matches that of the jumped-to source code block.

(Step 32) If no matching descriptor is found, the execution process calls the translation process 21, to perform the following actions. First, the translation process accesses the jumped-to source code block. If it is not currently in the main memory, it will be automatically paged into the main memory at this stage by the paging mechanism. The translation process then translates the jumped-to block, thereby creating a new target code block. This initial translation is a "naive" one: that is to say, it involves no optimisation, or only a minimal amount of optimisation. A link field is added to the descriptor of the block that has just been executed, to point to this new target code block. The translation process also creates a new descriptor for the jumped-to block, containing a pointer to the newly created target code block. Initially, the execution count value and the link count values in the new descriptor are set to zero, and the links are both set to null values.

(Step 33) The execution process then updates the execution count value and the appropriate link count value in the descriptor of the source code block that has just been executed. In this way, a record is kept of the execution behaviour of the blocks.

(Step 34) The execution process then checks whether the execution count value in the descriptor of the jumped-to block is greater than a predetermined threshold value. If so, the jumped-to block is considered to be "hot", and is therefore a good candidate for further optimisation.

(Step 35) If the jumped-to block is "hot", the execution process calls a block coalition process, to perform the following actions.

Figure 4:
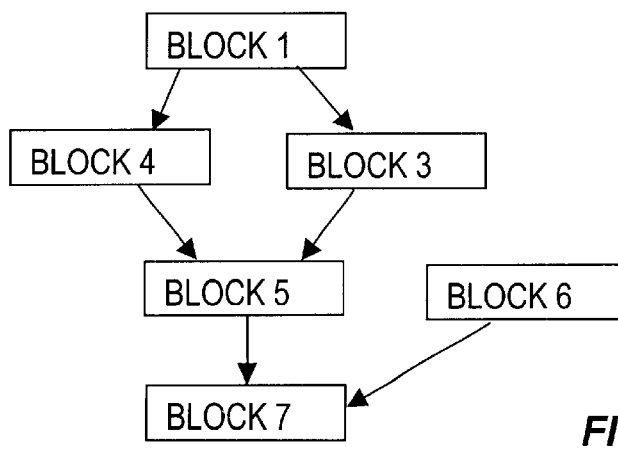
FIG. 4 is a schematic representation of a number of blocks, and the links between them.

First, the block coalition process uses the linkage information contained in the descriptors to identify target code blocks that form a potential superblock, starting from the jumped-to block. A potential superblock is a set of blocks that are linked directly or indirectly to the starting block and which do not have any other entry points. For example, FIG. 4 shows a number of blocks and the links between them. In this case, it can be seen that blocks 1,3,4 and 5 form a potential superblock, since they have only one entry point (block 1). Blocks 6 and 7 cannot be included in this superblock since, if they were included, the resulting superblock would have two entry points (blocks 1 and 6).

Next, assuming that a potential superblock has been identified, the block coalition process combines the component blocks to form a superblock. This can be done in one of two different ways:

Simply join together the already-translated code from the component target code blocks.

Retranslate the source code blocks, using information in the descriptors about the relative frequencies of execution of the component blocks to determine the degree of optimisation to apply to the superblock: rarely executed blocks receive minimal optimisation while frequently executed blocks receive maximum optimisation.

In forming the superblock, the order of the component blocks within the superblock may be shuffled, so as to ensure that the most frequently executed path through the block is the "fall through" case, i.e. it has no internal taken jumps. For example, in FIG. 4, if it is determined that block 4 is executed less than block 3, then the main path is block 1, followed by block 3, followed by block 5. The blocks would therefore be arranged in the superblock in the order 1, 3, 5 and 4. It should also be noted that the superblock may contain "holes": in this example, it is assumed that block 2 was not executed, and so it is not included in the superblock.

The block coalition process then creates a new source code descriptor for the newly-created superblock. It also deletes the existing target code blocks that were the component blocks for the new superblock, and their associated descriptors.

(Step 36) Finally, the execution process jumps to the target code block specified in the descriptor of the jumped-to block or of the newly created superblock. This becomes the current target code block, and the loop is repeated.

It will be appreciated that as execution proceeds, the blocks, which were originally naively translated, are progressively combined into superblocks and become more optimised. The superblocks may in turn be combined into even bigger superblocks, resulting in further optimisation.

From time to time, the paging mechanism has to remove (page out) some of the source code blocks from the main memory, to make room for paging in other source code blocks. The blocks that are paged out are always in a specified contiguous range of virtual addresses. When this happens, the paging mechanism informs the translation process, passing it the virtual address range of the blocks being paged out. The translation process then scans all the source code descriptors. If the start address or end address of a descriptor is within the specified address range, the corresponding target code block is deleted, and then the descriptor itself is deleted.

SOME POSSIBLE MODIFICATIONS

It will be appreciated that many modifications may be made to the system described above without departing from the scope of the present invention.

In particular, instead of naively translating the source code blocks when they are paged in, they could be executed directly by interpretation, without creating a target code block at this stage. In this modification, source code would be translated only when a superblock is formed.

Although in the above example each block was permitted to have a maximum of two exit points, it will be appreciated that this restriction is merely an implementation detail, and is not essential to the invention.

What is claimed is:

1. A computer system comprising:
   (a) translation means for translating blocks of instructions from a source code into a target code;
   (b) execution means for executing the blocks, while building up dynamic behaviour information about relationships between the blocks; and
   (c) block coalition means for selecting a related group of blocks on the basis of the dynamic behaviour information, creating a new block of target code instructions that is functionally equivalent to the combination of the selected group of blocks, and replacing the selected group of blocks with the new block.

2. A computer system according to claim 1, wherein the dynamic behaviour information includes information about frequency of execution of the blocks.

3. A computer system according to claim 2, wherein the translation means includes means for optimizing a translated block to a degree determined by the frequency of execution of that block.

4. A computer system according to claim 2, wherein combining the selected group of blocks to form a new block is triggered when the frequency of execution of one of the group of blocks exceeds a threshold value.

5. A computer system according to claim 1, including means for paging blocks of source code instructions into a main memory on demand.

6. A computer system according to claim 5 wherein a descriptor is provided for each block of source code instructions loaded into the main memory, the descriptor containing a pointer to a corresponding block of target code instructions and also containing the dynamic behaviour information for that block.

7. A computer system according to claim 6 wherein, when a new block is created by combining a selected group of blocks, a new descriptor is created for the new block, and the individual target blocks in that group and their associated descriptors are deleted.

8. A computer system according to claim 1, wherein the block coalition mechanism includes means for shuffling the order of the selected blocks within the new block to ensure that the most frequent path through the new block is the fall-through case.

9. A computer system according to claim 1 wherein the blocks selected to form a new block are contiguously addressed blocks.

10. A computer system according to claim 1 wherein said block coalition means comprises means for retranslating a plurality of said source code instructions to create said new block.

11. A method for executing instructions in a computer system, comprising the steps:
   (a) translating blocks of instructions from a source code into a target code;
   (b) executing the blocks, while building up dynamic behaviour information about relationships between the blocks;
   (c) selecting a related group of blocks on the basis of the dynamic behaviour information;
   (d) creating a new block of target code instructions that is functionally equivalent to the combination of the selected group of blocks; and
   (e) replacing the selected group of blocks with the new block.

12. A method according to claim 11, wherein the dynamic behaviour information includes information about frequency of execution of the blocks.

13. A method according to claim 12, further including optimizing a translated block to a degree determined by the frequency of execution of that block.

14. A method according to claim 12, wherein the step of combining the selected group of blocks to form a new block is triggered when the frequency of execution of one of the group of blocks exceeds a threshold value.

15. A method according to claim 11, wherein blocks of source code instructions are paged into a main memory on demand.

16. A method according to claim 11, further including creating a descriptor for each block of source code instructions loaded into the main memory, the descriptor containing a pointer to a corresponding block of target code instructions and also containing the dynamic behaviour information for that block.

17. A method according to claim 16 wherein, when a new block is created by combining a selected group of blocks, a new descriptor is created for the new block, and the individual target blocks in that group and their associated descriptors are deleted.

18. A method according to claim 11, further including shuffling the order of the selected blocks within the new block to ensure that the most frequent path through the new block is the fall-through case.

19. A method according to claims 11, wherein the blocks selected to form a new block are contiguously addressed blocks.

20. A method according to claim 11 wherein said step of creating a new block of target code instructions comprises retranslating a plurality of said source code instructions.

21. A computer system comprising:
   (a) translation means for translating blocks of instructions from a source code into a target code;
   (b) execution means for executing the blocks;
   (c) means for identifying frequently executed blocks; and
   (d) block coalition means for selecting a group of linked blocks, including at least one block identified as a frequently executed block, creating a new block of target code instructions that is functionally equivalent to the combination of the selected group of blocks, and replacing the selected group of blocks with the new block.

22. A computer system according to claim 21 further including means for deleting said group of linked blocks after creation of said new block.

23. A computer system according to claim 21 wherein said block coalition means comprises means for retranslating a plurality of source code blocks to form said new block of target code instructions.

24. A method for executing instructions in a computer system, comprising the steps:
   (a) translating blocks of instructions from a source code into a target code;
   (b) executing the blocks;
   (c) identifying frequently executed blocks;
   (d) selecting a group of linked blocks, including at least one block identified as a frequently executed block;
   (e) creating a new block of target code instructions that is functionally equivalent to the combination of the selected group of blocks; and
   (f) replacing the selected group of blocks with the new block.

25. A method according to claim 24 further including deleting said group of linked blocks after creation of said new block.

26. A method according to claim 24 wherein said new block of target code instructions is formed by retranslating a plurality of source code blocks.

* * * * *